June 15, 1971 H. K. HAZEL ET AL 3,584,362

APPARATUS FOR WIRING FERRITE CARE MATRICES

Original Filed April 30, 1965 4 Sheets--Sheet 1

INVENTORS
HERBERT K. HAZEL
WOLFGANG F. MUELLER

BY James E. Murray
ATTORNEY

APPARATUS FOR WIRING FERRITE CARE MATRICES

Original Filed April 30, 1965

United States Patent Office 3,584,362

Patented June 15, 1971

3,584,362

APPARATUS FOR WIRING FERRITE CORE MATRICES

Herbert K. Hazel, Poughkeepsie, and Wolfgang F. Mueller, Wappingers Falls, N.Y., assignors to International Business Machines Corporation, Armonk, N.Y.

Original application Apr. 30, 1965, Ser. No. 452,101, now Patent No. 3,460,245, dated Aug. 12, 1969. Divided and this application Mar. 12, 1969, Ser. No. 828,408.
Int. Cl. H05k *13/00;* B23p *19/04;* H01f *7/06*
U.S. Cl. 29—203MM 7 Claims

ABSTRACT OF THE DISCLOSURE

This specification describes the wiring of ferrite core matrices. First a number of wires with apertured ferrite elements strung on them are arranged side by side to form columns of ferrite elements that slide back and forth on the wires. Thereafter, one element on each length of wire is advanced to a wiring position to form a first selected row of ferrite elements. Then a row wire is inserted through the ferrite elements in the first selected row. After the row wire is inserted, the ferrite elements of the row are tested. Once the ferrite cores in the first selected row test good, the process is repeated for a second row. Preferably, the selected row of ferrite elements is held in position by air directed at the elements.

This is a division of application Ser. No. 452,101, filed Apr. 30, 1965, now Pat. No. 3,460,245, issued Aug. 12, 1969.

The present invention relates to the wiring of apertured articles into coordinate groupings and more particularly to the wiring of ferrite cores into matrices.

Apertured ferrite elements, commonly referred to as ferrite or magnetic cores, are used quite extensively as storage elements in the random access memories of computers. In such memories, the ferrite elements are arranged in coordinate groupings called matrices on wires that are threaded through the apertures in the elements in at least two coordinate directions to permit the transmission of electrical signals along the wires to and from each of the elements. The threading of the wires through the apertures has always been tedious, time consuming and subject to error. Now it is further complicated by recent reductions in the size of the ferrite elements. These reductions in size make it extremely difficult, if not impossible, to commercially fabricate the ferrite elements of the new reduced size into matrices using current threading techniques and equipment. They also make it very difficult to repair defects in the completed matrices since this usually involves the hand threading of wires through the elements.

Therefore, it is an object of the present invention to provide improved apparatus for the wiring of coordinate groupings of apertured articles.

Another object of the invention is to enable the rapid and efficient wiring of very small ferrite elements into matrices.

A further object of the invention is to simplify the repair of defects in ferrite core matrices.

Other objects of the invention are to simplify the wiring of ferrite elements into matrices; prevent damage to the ferrite elements or the wires threaded through them during the fabrication of matrices; and provide wiring apparatus which are adaptable to the automatic threading of ferrite elements into matrices.

In accordance with the present invention, a number of lengths of wire each with apertured ferrite elements prestrung thereon are positioned along side each other to form columns of ferrite elements. Thereafter, the ferrite elements in the columns are wired into their coordinate positions in the matrix one row after another by advancing one element on each length of wire to a wiring position to form a selected row of ferrite elements and then inserting wire through the ferrite elements in the selected row while they are held properly oriented against a referencing member with air directed at them.

As shall be more apparent after reading the complete specification, fabrication in this manner enables the rapid assembly of small ferrite elements into matrices with a minimum of damage to the elements and the wires threaded through them. Furthermore, by testing each row of ferrite elements as it is being wired by the above described method, any defective element can be detected and replaced prior to the completion of its wiring. This simplifies the replacement of the defective elements, first of all, because it does not require the disassembly of the matrix, and secondly, because it allows the apparatus used to wire the matrix to be employed in the repair of the defect.

The foregoing and other objects, features and advantages of the invention will be apparent from the following more particular description of preferred embodiments of the invention, as illustrated in the accompanying drawings.

Figure 1:
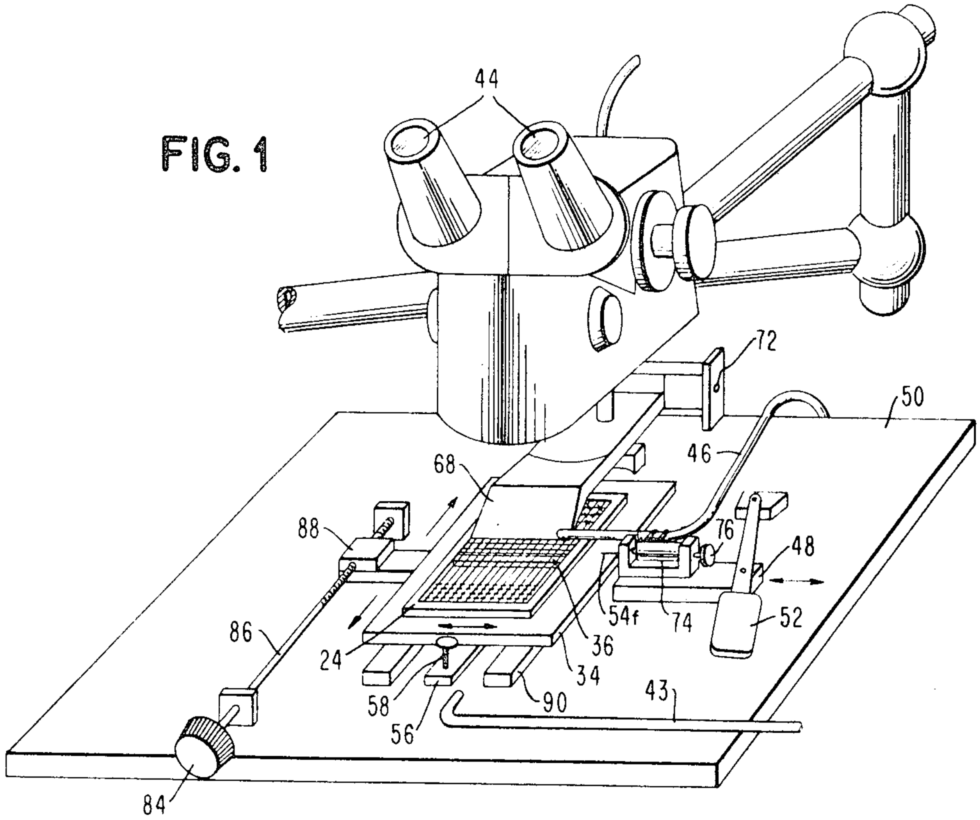
FIG. 1 is a perspective view of apparatus for the wiring of matrices in accordance with the present invention.
Figures 2, 4, 5, 6:
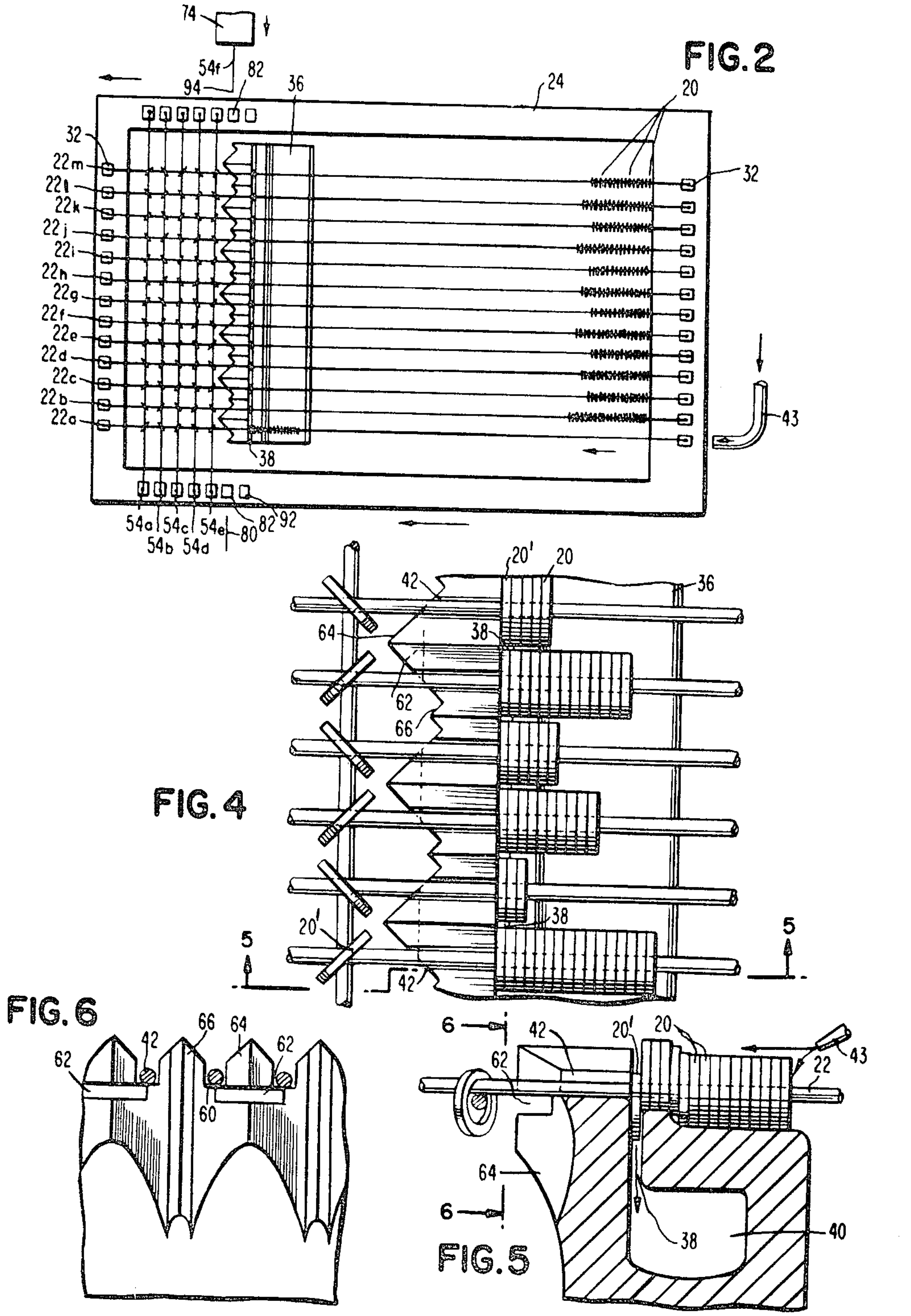
FIG. 2 is a plan view of the core matrix shown in the process of being wired with the apparatus shown in FIG. 1.
FIG. 4 is a plan view of a portion of the core matrix of FIG. 2 showing the prestrung cores advanced for the selection of the next row of cores to be wired.
FIG. 5 is a sectional view taken along line 5—5 in FIG. 4.
FIG. 6 is a plan view taken along line 6—6 in FIG. 5.

The apparatus illustrated in FIGS. 1 and 2 can be used to wire small, apertured ferrite elements, or cores, into memory matrices. However, prior to the wiring of the cores 20 into their matrix positions with this apparatus, the cores 20 are strung on wires 22*a* through 22*m* and the wires are thereafter arranged parallel to each other in a frame 24.

Figure 3:
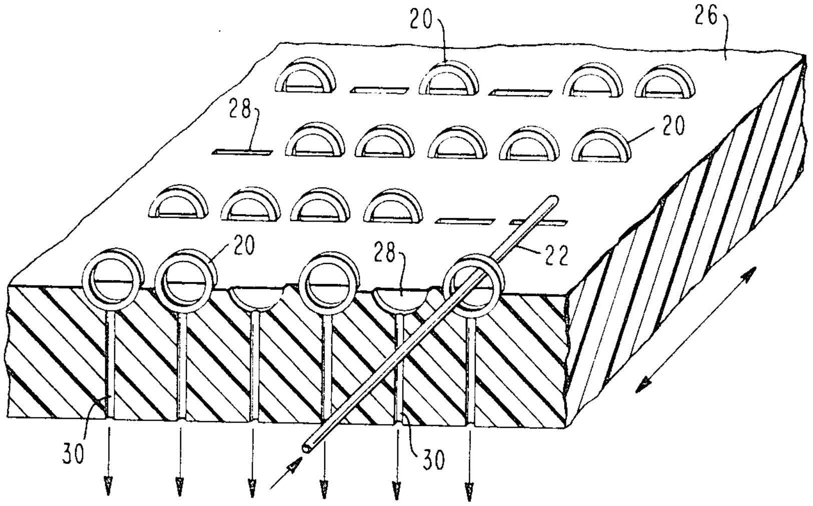
FIG. 3 is a schematic illustrating one way of stringing cores on wire.

The stringing of the cores 20 on the wires 22*a* through 22*m* can be carried out in the manner illustrated in FIG. 3. The cores 20 are spread across the top surface of a vibrating member 26 which has a number of semicylindrical slots 28 in its top surface that are connected to its bottom surface by passageways 30. A vacuum is applied to the bottom surface so that as the member vibrates the cores will slide across the top surface and be positioned in the slots 28 as illustrated by the suction produced by the vacuum. Once the cores 20 are in the slots 28, the vibrating of the member 26 is stopped and a wire 22 is moved over the member 26 in close proximity to the top surface so that it picks up a number of cores 20 in the manner illustrated. The above is repeated until the desired number of cores 20 are on each of the wires 22*a* through 22*m*. The wires 22*a* through 22*m* are then arranged parallel to one another in the frame 24 by stretching the wires 22*a* through 22*m* across the frame and soldering their ends to tinned contact areas 32 on opposite sides of the frame.

With the wires 22*a* through 22*m* mounted in it, the frame 24 is positioned on an annular platform 34 in the wiring apparatus of FIG. 1. The annular platform 34 is located over a core selection and reference member 36 which first selects a row of cores to be wired with a second wire and then holds these cores properly oriented while the second wire is passed through each of them at right angles to the wires 22*a* through 22*m*.

The member 36 has a slot 38 arranged transverse to the wires 22*a* through 22*m*. As is illustrated in FIG. 5, this transverse slot 38 leads to a cavity 40 which is held under vacuum so that air is drawn into the cavity 40 through the slot 38. With the member 36 in its operating position, the wires 22*a* through 22*m* pass over the slot 38 and through a wiring jig portion of the member in passageways 42 which are slightly wider than the thickness of wires. To select a row of cores for wiring, an air jet 43 is positioned behind the loose cores 20 so that the stream of air from the jet advances the cores along the wires 22*a* through 22*m* until the leading core 20′ in each line of cores hits the back edge of the wiring jig portion of the member 36, and is drawn into the slot 38 along with the air being sucked through the slot into the cavity 40 by the vacuum. Only the leading core 20′ on each wire 22 slips into the slot 38 in the manner shown in FIG. 5, because the slot is not wide enough for two cores to fit into it.

After the cores 20 have been advanced, the slot 38 is examined to make sure one core 20′ on each of the wires 22*a* through 22*m* is in the slot 38. Cores with an outside diameter as small as 12 mils and an inside diameter as small as 7 mils have been wired into matrices using the present techniques and it is anticipated that these techniques will be employed to wire matrices of even smaller cores in the future. Therefore, the microscope 44 is provided to make examinations when it is not possible to see what is going on with the naked eye.

Figures 7, 8, 9, 10:
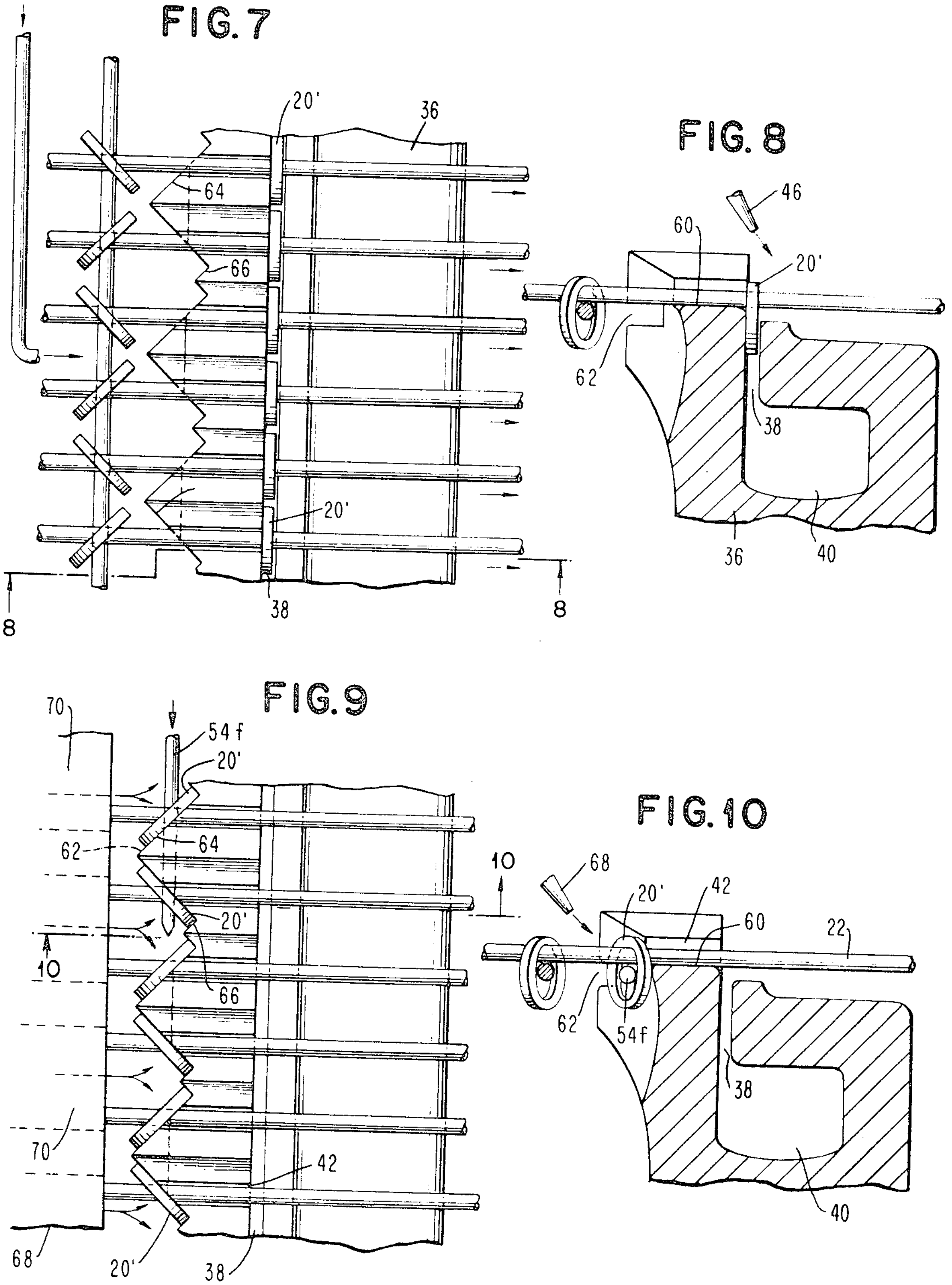
FIG. 7 is a plan view of a portion of the core matrix of FIG. 2 showing the next row of cores to be wired separated from the other loose prestrung cores on the wires.
FIG. 8 is a sectional view taken along line 8—8 in FIG. 7.
FIG. 9 is a plan view of a portion of the matrix in FIG. 2 showing the row of cores to be wired positioned against a reference member by air pressure.
FIG. 10 is a sectional view taken along line 10—10 in FIG. 9.

After the leading core 20′ on each of the wires 22*a* through 22*m* has been positioned in the groove 38, a second air jet 46 is used to blow the loose cores 20 back away from the groove 38. As is shown in FIG. 1, this second air jet 46 is mounted on a sliding block 48 which moves transverse to the wires 22*a* through 22*m* across the main supporting surface 50 of the matrix wiring apparatus when a handle 52 of the apparatus is moved. The handle 52 is moved back and forth a few times so that the jet 46 moves the length of member 36 and directs air against the cores 20 on each of the wires 22*a* through 22m. As is illustrated in FIGS. 7 and 8, the jet 46, as it passes over each of the wires 22*a* through 22*m*, blows all the loose cores 20 except the first loose core 20′ on each wire back away from the member 36. The reason core 20′ is not blown back is because it is held in the groove 38 by the vacuum in the cavity 40 while the other loose cores, being free of the vacuum, slide along each wire to the rear of the frame 24. Thus the first core 20′ on each of the wires 22*a* through 22*m* is separated from the remainder of the unwound cores 20.

Once one core 20′ on each of the lines 22*a* through 22*m* is separated from the other cores on those lines, another row of cores may be wired into their matrix position by a second wire. This is illustrated in FIGS. 9 and 10. As is shown in those figures, the cores 20′ are positioned against the front face of the member 36 while a transverse wire 54*f* is threaded through them. To permit the positioning of the cores 20′ against the front face of the member 36, the member is lowered sufficiently to allow the cores 20′ to clear the top of the wiring jig portion of the member 36. For this purpose, the member 36 is mounted for vertical movement on one end of a pivot arm 56 partially shown in FIG. 1. A screw 58 is threaded through the other end of the pivot arm 56, and the pivot point for the arm is on the supporting surface 50 between the screw 58 and the member 36. The arm 56 is spring loaded around its pivot point so that the screw 58 bears against the supporting surface 50 at all times. Therefore, the screw 58 can be turned on to raise and lower member 36 by respectively decreasing and increasing the amount of thread of the screw between the pivot arm 56 and the supporting surface 50. When member 36 is lowered, the wires 22*a* through 22*m* are above the passageways in which they had previously been positioned so that the cores 20′ can be moved along the wires to a position in front of the member 36. To advance the cores 20′ to this position, the air jet 43 is employed.

Once all the cores 20′ are positioned in front of the member 36 the member is raised by the screw 58 until the wires 22*a* through 22*m* rest on the bottom surfaces 60 of the passageways 42 as is shown in FIG. 9. In this position, the wires 22*a* through 22*m* are located just above a horizontal slot 62 which opens to the front of the member 36. This slot 62 extends the length of the member 36 so as to permit wires to pass through it at right angles to the wires 22*a* through 22*m* on which the cores 20 are prestrung.

As can be seen in either FIG. 7 or FIG. 9, the front face of the member 36 resembles a series of side by side *w*'s when viewed from above. Two cores 20′ nest inside each of the *w*'s with their sides against the surfaces 64 of the front face which resemble the exterior arms of the *w* and their edges touching the surfaces 66 resembling the interior arms of the *w*. The orientation of the surfaces 64 is selected so that the cores 20' will be positioned to present the maximum aperture area to the transverse wire 54*f* being threaded through them. The cores 20′ are held in the above described position against the front face of member 36 by air directed at them from a flat nozzle 68 positioned over the wires 22 and 54*f* in front of the member 36. The nozzle 68 has a number of spaced ports 70 which direct air at the center of the *w*'s to force the cores 20′ against the wall 64. The nozzle 68 is mounted for rotation around pivot axis 72 and during all the previous steps in the wiring operation was positioned away from the matrix being wired, so that air from the nozzle would not interfere with the completion of previous steps of the process. However, once the cores have been positioned in front of the member 36 and the member has been raised, the nozzle 68 is dropped into the position shown in FIG. 1 so as to direct air at the cores 20′ and the member 36 to position the cores against the member. Also, since the nozzle 68 is positioned above the wires 22*a* through 22*m*, there is a downward component of force which holds the top portion of the cores 20′ against these wires. This leaves the major portion of the aperture in the cores 20′ positioned below the wires 22*a* through 22*m* and over the horizontal slot 62 in the face of the member 36. Therefore, if one could look at one side of the member 36, he could look along the slot 62 through all the cores 20′. For this reason, the wire 54*f* is free to move in the slot 62 through the cores 20′.

To facilitate the advance of the wire through the cores 20′, the source 74, of the wire is mounted on the sliding block 48. Thus, the source 74, and therefore the wire, can be advanced with handle 52. The operator advances the source until the tip of the wire 54*f* is through the first core 20′ on the right. Thereafter the wire 54*f* is fed off a coil in the source by rotating a knob 76. This increases the length of the extended portion of the wire and passes it through all the cores so that it emerges on the other side of the matrix. All the time the wire is being threaded through the cores, air from the nozzle 68 is directed at the cores 20' to hold the cores in position against the member 36 as previously described.

Besides air pressure, other means which provide a directional force may possibly be used to hold the cores 20' in position against the member 36. However, it has been found that when air pressure is employed in the manner described, the wire is much easier to thread through the cores. It appear that this is due to a lubricating effect caused by air from the nozzle 68. Apparently, the air travels around the interior sidewalls of the cores 20' and along the wire **54*f* being threaded through the cores to form a lubricating barrier which eases the movement of the wire 54*f* through the cores 20'. In any case, irrespective of reasons, the use of air to hold the cores 20'** in position while they are threaded greatly simplifies the task of threading and is considered to be one of the prime reasons for the success of the present method.

Figure 11:
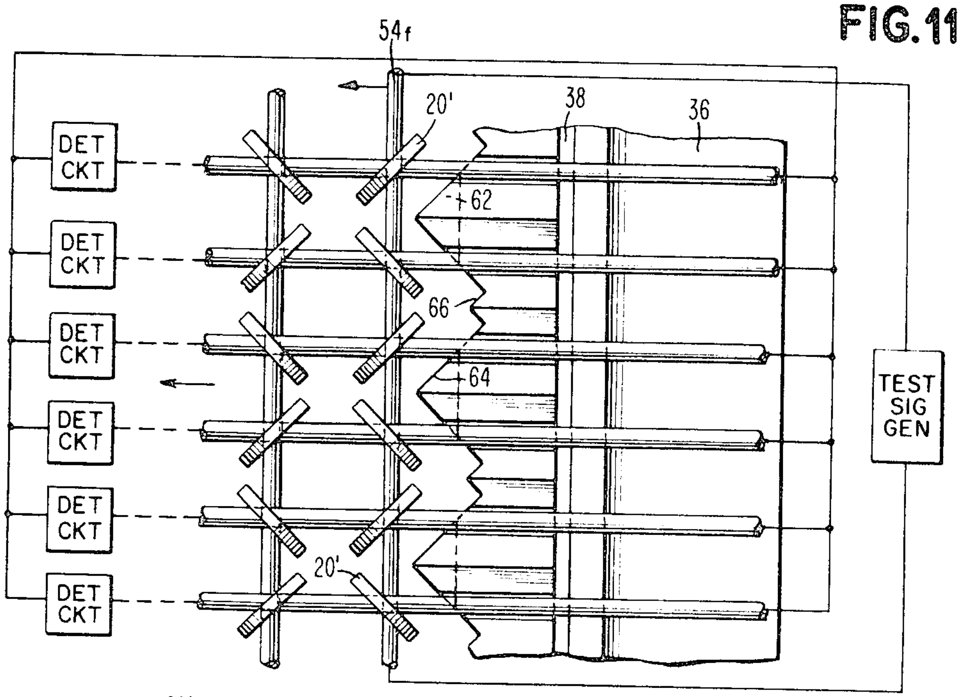
FIG. 11 is a plan view of a portion of the matrix in FIG. 2 showing the completion of the wiring of the second wire through a row of cores.

Once the wire **54*f* has been threaded through all the cores 20' the cores 20' can be tested by connecting wire 54*f* in series with a test signal generator and each of the wires 22*a* through 22*m* in series with individual detection circuits as is illustrated in FIG. 11 so that a test signal can be transmitted along wire 54*f* and the response of the cores 20' can be individually measured with the detection circuits conneced to wires 22*a* through 22*m*. If a bad core is detected it is a simple matter to break it, retract wire 54*f*** from the row of cores and then select and wire a new row of cores to replace the row with the defective core by using the core selection and wire threading techniques described above. Later on when the matrix is completed, the removal of a defective core is more difficult. This is because it requires the partial disassembly of the completed matrix and the replacement core must be hand wired into the matrix. Besides being expensive, slow and tedious, reworking of the memory plane by hand is inferior to rewiring with the equipment disclosed in FIG. 1 because of possible extensive damage to the matrix during reworking by hand.

It may be desirable to employ a separate test probe instead of the matrix wire for testing the cores as described above. This can be done by inserting the test probe 80 through the cores 20' from the left hand side of the frame 24 just prior to the insertion of the matrix wires **54*f* and retracting the test probe 80 after the test to allow the threading of wire 54*f* through the slot 62**.

After the wire **54*f* has been threaded through all the cores 20' and the cores 20' have been tested, the wire 54*f* is fixed in position on the frame 24 by soldering each end to tinned contact areas 82 on opposite sides of the frame. With the wire 54*f* soldered in position, its connection to the source of wire 74 can be broken. This is best done by clamping the wire adjacent the right hand side of the frame 24 and then using the handle 52 to back the source of wire 74 away from the frame while maintaining the length of the wire substantially fixed. This causes the wire to snap at some point intermediate the point where it is clamped and source of wire 74**. By breaking the wire in this manner the normally flexible copper wire will harden and become fairly rigid because of the tensile forces exerted on the wire to break it. Therefore, the tip of the wire is given a hard needle-like leading end which enables thin flexible wire to be fed through a row of cores without the use of a hollow needle. This wire hardening technique is disclosed and claimed in copending application, Ser. No. 363,481, filed Apr. 29, 1964.

With the wiring of the wire **54*f* completed, the machine can be employed to wire another row of cores. To facilitate this, the apertured platform 32 on which the frame 24 rests can be moved relative to the member 36 and the wiring source 74. The table is moved by rotating the knob 84 which directly drives a threaded lead screw 86. This threaded lead screw in turn drives a threaded block 88 which is fixed to the platform 34. The platform 34 is slidably mounted on guides 90 so that as the threaded block moves the platform 34 moves with it. Movement of the platform with the block 88 causes the frame 24 to move relative to the member 36 which is fixed to the work surface 50 at its pivot point. Thus, as is illustrated in FIG. 11, the cores 20' move away from the surfaces 64 and 66 and the wire 54*f* moves out of open end of slot 64. Rotation of the knob 84 is stopped when the tinned pads 92 for attaching the wire 54*g* to the frame 24 are aligned with the now hardened tip 94 of the wire. The wire tip and the reference block remain in position and thus they are properly aligned for wiring. After the platform 34 has been advanced to the proper position the wire 54*g* may be wired by repeating the previously described sequence of steps, as were the wires 54*a* through 54*g* prior to the threading of wire 54*f*. The threading of the second wire through the core as described above is repeated one row of cores at a time until the matrix is completed. The familiar diamond pattern of cores is obtained by moving the member 36** one wire to the right or left after wiring each row of cores.

Figure 12:
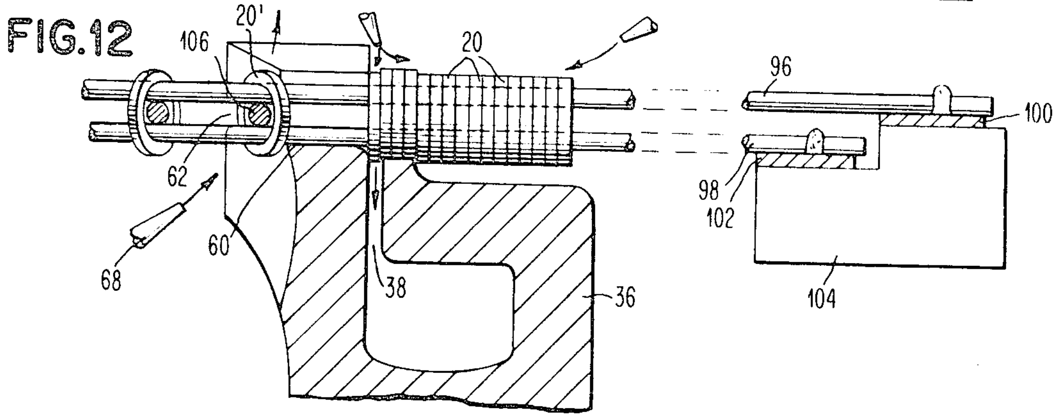
FIG. 12 is a sectional view illustrating how a three wire core matrix can be wired with the techniques illustrated in FIGS. 1 to 11.

The present invention has just been described in reference to wiring a two wire core matrix. However, three wire core matrices may be wired using the same techniques in the manner shown in FIG. 12. Here cores 20 are prestrung on two wires instead of one wire. The two wires 96 and 98 are soldered to tinned pads 100 and 102 on a rectangular frame 104 at two different vertical heights. Thus the prestrung cores 20 are suspended in the frame in a number of parallel rows on two spaced wires. The cores are then strung in rows on the third wire 106, threaded through the spaced wires 96 and 98 of each row of prestrung cores in much the same manner as was described with respect to the wiring of the two wire matrix as illustrated in FIGS. 1 through 11.

The selection of a row of cores to be wired is accomplished in the same manner as described previously, Also, after selection the selected cores are moved to the front of the member 36 and held against the member 36 by air pressure in the same way as was discussed earlier. The lower wire 98 rests on the bottom surface 60 of the passageway 42 below the slot 62 and the vertical distance between the wires 96 and 98 is such that the other wire 96 passes over the top of the slot 62. Therefore the transverse wire 106 is free to pass along the slot 62 through the cores 20' in the space between the wires 96 and 98. It should be apparent that in FIG. 12 the nozzle 68 is positioned below the wires instead of on top of the wires as it is in FIGS. 1 to 11. This lower position of the nozzle 68 is preferred since it has been found that it reduces the air turbulence around the wires and the cores making it easier to string the third wire 106 through the other two wires 96 and 98. As pointed out above, aside from the position of the air nozzle 68 and the positioning of the two wires, the method is essentially the same as that described previously.

Figure 13:
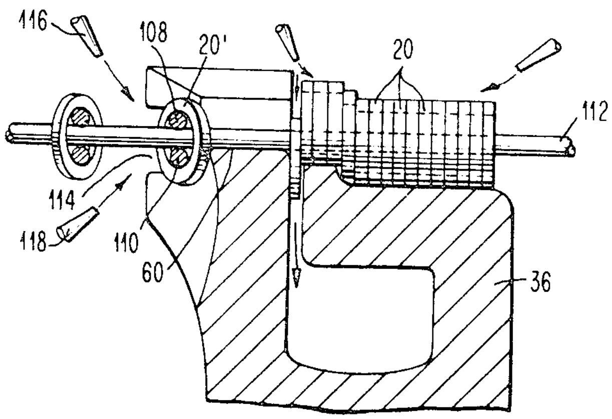
FIG. 13 is a sectional view illustrating an alternative way of fabricating a three wire core matrix with the techniques illustrated in FIGS. 1 to 11.

The embodiment shown in FIG. 13 illustrates the stringing of two transverse wires 108 and 110 through cores 20 which are prestrung on one wire 112. To facilitate this, the reference block 36 has a larger opening 114 in its face to accept both transverse wires 108 and 110 and the bottom edges 60 of the passageways 42 support the wires 112 halfway in the middle of the slot 114 instead of one side or the other of the slot. In addition, two nozzles are employed, one 116 on top of the transverse wire 108 and the other 118 on the bottom of the wire 110. By employing these two jets alternately, it is possible to first string one wire 108 through on top of the wire 112 and then string the other wire 110 on the bottom of the wire 112. This is accomplished by first using air from nozzle 118 to force the cores 20' upward while wire 108 is strung through the cores and thereafter using air from nozzle 116 to force the cores downward while the second transverse wire 110 is strung through the cores.

Obviously a number of modifications can be made in the above described apparatus and process may be made without departing from the spirit and scope of the present invention. For instance, the cores 20 may be prestrung on the wires 22 by means other than that shown in FIG. 3. Therefore, while the invention has been particularly shown and described with reference to three preferred embodiments thereof, it will be understood by those skilled in the art that various changes in form and details may be made therein without departing from the spirit and scope of the invention.

What is claimed:

1. Apparatus for threading a wire through the apertures of cores arranged in a row and prestrung on separate lengths of wire arranged transversely to said row comprising: wiring jig means for holding said cores in a row at an acute angle to the lengths of wire on which they are prestrung, means for advancing wire along said row and through the apertures in said cores while they are held in position by said wiring jig means, and means for directing a gaseous fluid at said row while the wire is being advanced through said cores.

2. Apparatus for threading a wire through the apertures of cores arranged in a row and slidably prestrung on lengths of wire arranged transversely to said row comprising: wiring jig means having surfaces against which the cores are positioned at an acute angle to the lengths of wire on which they were prestrung for holding said cores in said row, said surfaces having openings therein for allowing a wire to be threaded along said row through the apertures of the cores when they are positioned against said surfaces, means for advancing wire axially along said row and through the apertures in the cores while they are held in said row against said surfaces, and means for directing gaseous fluid against said cores to hold them in said row against said surfaces while the wire is being advanced along said row and through the apertures in the cores.

3. Apparatus for stringing wires through the apertures of cores slidably prestrung on a number of lengths of wire arranged side by side in an open frame comprising a wiring station positioned transverse to the lengths of wire, wiring jig means positioned at said station transverse to said lengths of wire, core advancing means for separating certain of the prestrung cores from the other prestrung cores, nozzle means for directing gaseous fluid at the separated cores to hold them in position against said wiring jig means, wire advancing means positioned at said station for advancing wire transversely to the lengths of wire through the apertures of the cores held in a row against the wiring jig means, and means for moving the wiring station and the open frame relative to each other along the lengths of wire whereby wire can be positioned through a series of rows of the slidably prestrung cores one row at a time.

4. The structure of claim 3 wherein said core advancing means includes means which define a chamber with an opening therein in the form of a slot which is wider than one core and narrower than two cores and which extends along the back of the wiring jig means so that one core strung on each of the lengths of wire will drop therein, means for advancing the cores slidably prestrung on the lengths of wire to said slot so that one core on each of the lengths of wire will drop in the slot, means for holding said chamber under vacuum to create suction that will draw cores into the slot and hold them there, and jet means to blow cores away from the slot so as to separate the cores positioned in the slot from the other cores slidably prestrung on the wire.

5. The structure of claim 4 wherein said wiring jig means has an irregularly shaped front with a number of surfaces against which the cores are held for wiring, a horizontal slot in the face arranged at an acute angle to said surfaces for the threading of wire through the apertures of the wires positioned against the surfaces for wiring, and a number of vertical slots arranged at right angles to said horizontal slot and at an acute angle to said surfaces to receive the length of wire on which the cores were prestrung.

6. The structure of claim 5 wherein means for holding the separated cores against the wiring jig means is nozzle means positioned in front of said wiring jig means for directing gaseous fluid at the separated cores to hold them in position against said surfaces.

7. The structure of claim 6 including means for lowering and raising said wiring jig means with respect to said lengths of wire to provide two vertical positions for said wiring jig means, one position in which the lengths of wire are positioned in the vertical slots so that cores can be positioned against the surfaces for the threading of wires therethrough and the other position in which the lengths of wires are positioned free of the vertical grooves to permit the advancing of cores from the back of the jig means where they were separated from other cores to the front of the jig means where a wire can be threaded through them.

References Cited

UNITED STATES PATENTS

| | | | |
|---|---|---|---|
| 3,134,163 | 5/1964 | Luhn | 29—241X |
| 3,460,245 | 8/1969 | Hazel et al. | 29—604 |

THOMAS H. EAGER, Primary Examiner

U.S. Cl. X.R.

29—241, 604